United States Patent
Therrat et al.

(10) Patent No.: US 10,469,157 B2
(45) Date of Patent: Nov. 5, 2019

(54) ELECTRONIC COMMUNICATION GATEWAY, AN AVIONICS COMMUNICATION INSTALLATION COMPRISING SUCH A GATEWAY, RELATED METHOD FOR PROCESSING INFORMATION AND COMPUTER PROGRAM

(71) Applicant: Thales, Courbevoie (FR)

(72) Inventors: Cyril Therrat, Toulouse (FR); Laurent Patau, Toulouse (FR)

(73) Assignee: THALES, Courbevoie (FR)

(*) Notice: Subject to any disclaimer, the term of this patent is extended or adjusted under 35 U.S.C. 154(b) by 56 days.

(21) Appl. No.: 15/864,061

(22) Filed: Jan. 8, 2018

(65) Prior Publication Data

US 2018/0212673 A1   Jul. 26, 2018

(30) Foreign Application Priority Data

Jan. 26, 2017   (FR) .................................. 17 00082

(51) Int. Cl.
| | |
|---|---|
| H04L 12/28 | (2006.01) |
| H04B 7/185 | (2006.01) |
| H04L 29/08 | (2006.01) |
| H04L 29/06 | (2006.01) |
| H04W 88/16 | (2009.01) |

(52) U.S. Cl.
CPC ......... H04B 7/18506 (2013.01); H04L 67/12 (2013.01); H04L 69/28 (2013.01); H04W 88/16 (2013.01)

(58) Field of Classification Search
CPC ........................................................ H04L 12/28
USPC .......................................................... 370/329
See application file for complete search history.

(56) References Cited

U.S. PATENT DOCUMENTS

| 7,873,024 B1 | 1/2011 | Fenwick et al. |
| 2007/0264953 A1 | 11/2007 | Srinivasan et al. |
| 2010/0148940 A1* | 6/2010 | Gelvin .................. G06F 15/173 340/286.02 |

OTHER PUBLICATIONS

French Patent Application No. 17 00082, INPI Rapport de Recherche Préliminaire, Oct. 10, 2017, 2 pages.

* cited by examiner

*Primary Examiner* — Dang T Ton
(74) *Attorney, Agent, or Firm* — Soquel Group LLC

(57) ABSTRACT

This electronic communication gateway is intended to be placed on board an aircraft, and is configured to communicate with an external electronic system, positioned outside the aircraft, said information being exchanged in the form of radio waves between the external system and the aircraft; the electronic communication gateway includes an acquisition module configured to acquire information from the external system, and a transmission module configured to transmit the acquired information to an avionics system on board the aircraft; the acquisition module is configured to acquire, from the external system, a current date upon powering on the gateway, and the transmission module is configured to send the acquired current date to the avionics system, for the initialization of the avionics system.

11 Claims, 2 Drawing Sheets

ELECTRONIC COMMUNICATION GATEWAY, AN AVIONICS COMMUNICATION INSTALLATION COMPRISING SUCH A GATEWAY, RELATED METHOD FOR PROCESSING INFORMATION AND COMPUTER PROGRAM

CROSS-REFERENCE TO RELATED APPLICATIONS

This application claims priority under 35 USC § 119 of French Application No. 17 00082, filed on Jan. 26, 2017, which is incorporated herein by reference in its entirety.

FIELD OF THE INVENTION

The present invention relates to an electronic communication gateway intended to be placed on board an aircraft and configured to communicate with an external electronic system, positioned outside the aircraft, said information being exchanged in the form of radio waves between the external system and the aircraft.

The electronic communication gateway comprises an acquisition module configured to acquire information from the external system, and a transmission module configured to transmit the acquired information to an avionics system on board the aircraft.

The invention also relates to an avionics communication installation intended to be placed on board an aircraft, the avionics communication installation comprising a set of avionics system(s) and such an electronic communication gateway connected to the set of avionics system(s).

The invention also relates to a method for processing information, the method being carried out by such an electronic communication gateway.

The invention also relates to a non-transitory computer-readable medium including a computer program including software instructions which, when executed by a computer, implement such an information processing method.

The invention relates to the field of communications on board an aircraft, in particular during powering on of avionics systems on board the aircraft.

The invention then more particularly relates to the field of avionic communication equipment, installed onboard aircraft, then preferably according to standard ARINC 664.

BACKGROUND OF THE INVENTION

A communication gateway of the aforementioned type is known. This communication gateway is on board an aircraft, and allows the aircraft to communicate with an external electronic system, positioned outside the aircraft, the information then being exchanged in the form of radio waves between the external system and the aircraft.

The communication gateway then forms a communication interface between said external electronic system and one or several avionics systems on board the aircraft.

The communication gateway generally further comprises a computer firewall configured to filter the information coming from the external system, so that the exchanges of data between avionics systems on board the aircraft are secured with respect to the domain outside the aircraft. The communication gateway then delimits two communication domains, i.e., on the one hand, a secure avionics domain, also called ACD (Aircraft Control Domain), and on the other hand, an intermediate non-secured domain, also called AISD (Aircraft Information Service Domain). The communication gateway is then used to secure the incoming data streams, i.e., the data streams from outside the aircraft intended for one or several avionics systems on board the aircraft.

However, such a communication gateway is subject to relatively restricted use, and is used only as an interface between a communication domain inside the aircraft and the domain outside the aircraft.

SUMMARY OF THE DESCRIPTION

The aim of the invention is then to propose an electronic communication gateway, and an associated method, making it possible to offer an additional functionality, and then to facilitate the initialization of one or several avionics systems on board the aircraft.

To that end, the invention relates to an electronic communication gateway of the aforementioned type, in which the acquisition module is configured to acquire, from the external system, a current date upon powering on the gateway, and the transmission module is configured to send the acquired current date to the avionics system, for the initialization of said avionics system.

The electronic communication gateway according to the invention then further makes it possible to acquire, when it is powered on and from the external system, a current date, then to send this current date to a corresponding avionics system, in order to facilitate the initialization of said avionics system.

Indeed, some avionics systems, such as a flight management system (FMS), a receiver for a satellite positioning system (GNSS, Global Navigation Satellite System), must know the current date when they are initialized, so as to be able to be initialized correctly.

With the communication gateway of the state of the art, knowing this current date then generally requires a manual initialization by a crew member, or the presence of a dedicated electronic clock, powered by an autonomous battery and able to send the current date to these avionics systems when they are initialized. Such a dedicated clock further requires regular maintenance to verify the state of its battery.

According to other advantageous aspects of the invention, the electronic communication gateway comprises one or more of the following features, considered alone or according to all technically possible combinations:

the acquisition module is further configured to acquire, from the external system, a current position of the aircraft when the gateway is powered on, and the transmission module is further configured to send the acquired current position to said avionics system, for the initialization of the latter;

the communication gateway further comprises a computation module configured to compute a UTC date from a local date, when the acquired current date is a local date.

The invention also relates to an avionics communication installation intended to be placed on board an aircraft, the avionics communication installation comprising a set of avionics system(s) and an electronic communication gateway connected to the set of avionics system(s), wherein the electronic communication gateway is as defined above.

According to other advantageous aspects of the invention, the avionics communication installation comprises one or more of the following features, considered alone or according to all technically possible combinations:

the set of avionics system(s) includes a flight management system, the electronic communication gateway being connected to the flight management system, and the transmission module is configured to send the acquired current date to the flight management system, for the initialization of said flight management system.

the set of avionics system(s) further includes a satellite positioning system, the flight management system is configured to send the satellite positioning system the current date received from the electronic communication gateway, for the initialization of said satellite positioning system, and the flight management system is configured to receive, from said satellite positioning system and after initialization, a current position of the aircraft;

the flight management system is configured to send, to the set of avionics system(s) and/or to the electronic communication gateway, the current position of the aircraft, received from the satellite positioning system;

the set of avionics system(s) includes a satellite positioning system, the electronic communication gateway being connected to the satellite positioning system, and the transmission module is configured to send the acquired current date to the satellite positioning system, for the initialization of said satellite positioning system; and the communication gateway further comprises a receiving module configured to receive, from said satellite positioning system and after initialization, a current position of the aircraft.

The present invention also relates to a method for processing information, the method being implemented by an electronic communication gateway intended to be placed on board an aircraft and configured to communicate with an external electronic system, positioned outside the aircraft, said information being exchanged in the form of radio waves between the external system and the aircraft, the method comprising:

the acquisition of information from the external system, and the transmission of the acquired information to an avionics system on board the aircraft, during the acquisition, a current date is acquired, from the external system, upon powering on the gateway, and during transmission, the acquired current date is sent to the avionics system, for the initialization of said avionics system.

The invention also relates to a non-transitory computer-readable medium including a computer program including software instructions which, when executed by a computer, implement a method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
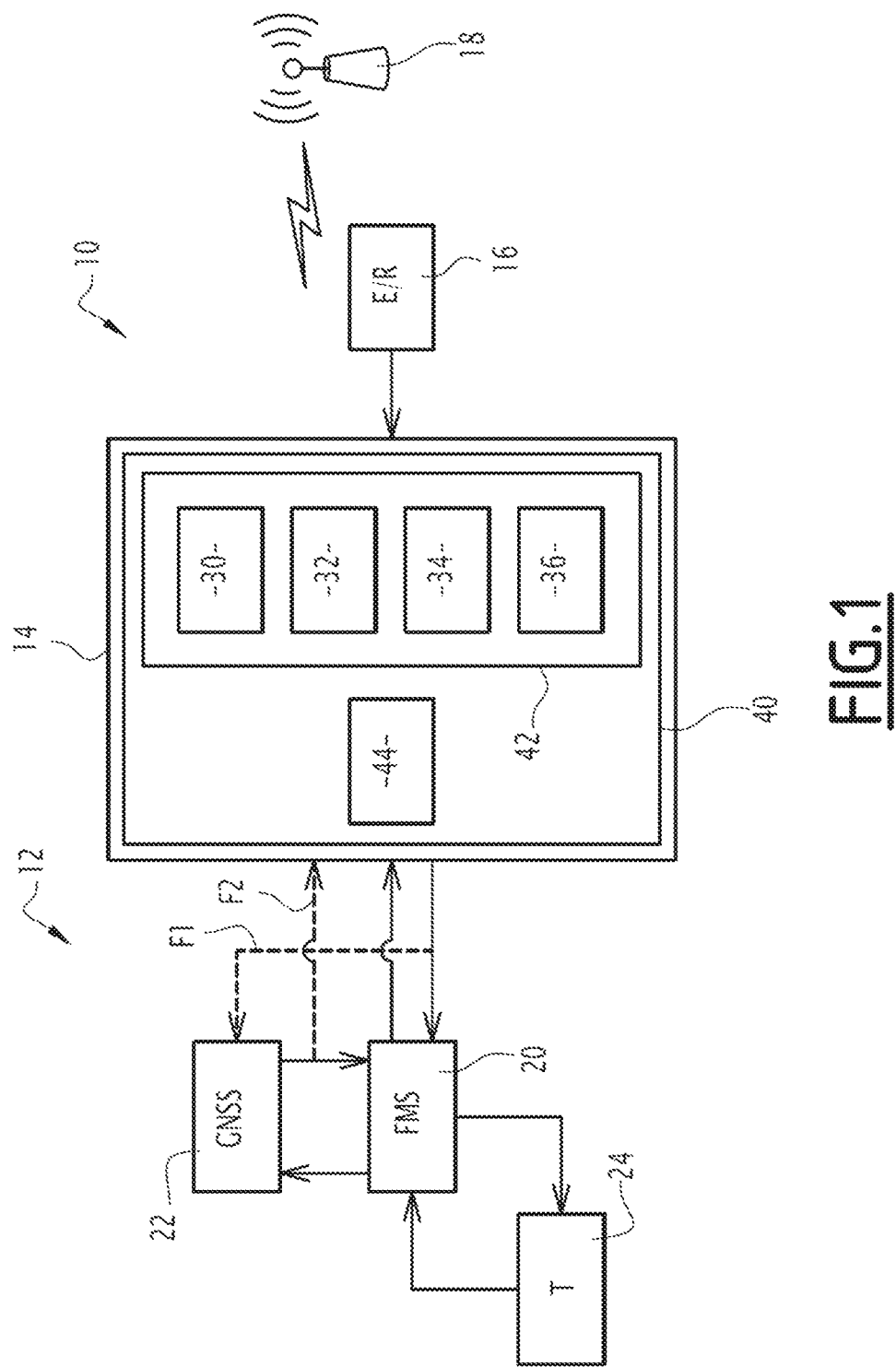
FIG. 1 is a schematic illustration of an avionics communication installation on board an aircraft, and able to communicate with an external electronic system positioned outside the aircraft, such as a base station positioned on the ground.

In FIG. 1, an avionics communication installation 10, intended to be on board an aircraft, comprises a set of avionics system(s) 12, an electronic communication gateway 14 connected to the set of avionics system(s) 12, and a transceiver 16 connected to the communication gateway 14 and able to exchange data in the form of radio waves with an external electronic system 18, positioned outside the aircraft.

The avionics communication installation 10 is for example according to standard ARINC 664, and the set of avionics system(s) 12, the electronic communication gateway 14 and the transceiver 16 are then connected to one another by communication links according to standard ARINC 664, such as a communication network according to standard ARINC 664. In particular, the avionics communication installation 10 is an AFDX (Avionics Full-Duplex Switched Ethernet) installation, the set of avionics system(s) 12 and the electronic communication gateway 14 being connected to one another by AFDX links, such as an AFDX network.

Alternatively, the avionics communication installation 10 is according to standard ARINC 429, the set of avionics system(s) 12 and the electronic communication gateway 14 then being connected to one another by communication links according to standard ARINC 429, such as a communication network according to standard ARINC 429.

Also alternatively, the avionics communication installation 10 is according to the Ethernet standard, and the set of avionics system(s) 12, the electronic communication gateway 14 and the transceiver 16 are then connected to one another by Ethernet links, such as an Ethernet network.

The set of avionics system(s) 12 includes a flight management system (FMS) 20, the electronic communication gateway 14 being connected to the flight management system 20.

As an optional addition, the set of avionics system(s) 12 further includes a satellite positioning system 22, the electronic communication gateway 14 being connected to the satellite positioning system 22.

As an optional addition, the set of avionics system(s) 12 further includes an electronic clock system 24 connected to the flight management system 20.

The communication gateway 14 is intended to be on board the aircraft and is configured to communicate with the external electronic system 18, for example via the transceiver 16. The communication gateway 14 is preferably according to standard ARINC 664, such as an AFDX communication gateway. Alternatively, the communication gateway 14 is preferably according to standard ARINC 429, or the Ethernet standard.

The electronic communication gateway 14 comprises an acquisition module 30 configured to acquire information from the external system 18, and a transmission module 32 configured to transmit the acquired information to an avionics system 20, 22 on board the aircraft.

According to the invention, the acquisition module 30 is further configured to acquire, from the external system 18, a current date upon powering on the gateway 14. The transmission module 32 is then configured to send the acquired current date to the avionics system 20, 22, for the initialization of said avionics system 20, 22.

"Date", in particular for the current date, in particular the local date or the UTC date, refers to a moment in time defined uniquely, i.e., a day and the time.

"Local date" refers to a date defined locally and without any reference to the coordinated universal time or a given time zone, in particular without the device providing this date knowing the time zone to which said local date corresponds.

As an optional addition, the communication gateway 14 further comprises a computation module 34 configured to compute a UTC date from a local date, when the acquired current date is a local date. The UTC date is also called coordinated universal time date.

As an optional addition, the communication gateway 14 further comprises a receiving module 36 in particular configured to receive a current position of the aircraft, from said satellite positioning system 22 and after its initialization, during which the satellite positioning system 22 has received the current date from the communication gateway 14.

The communication gateway 14 further comprises a firewall, not shown, configured to filter the information coming from the external system 18. The communication gateway 14 is then also called security server.

The communication gateway 14 is for example at the interface between two communication domains, i.e., on the one hand, a secure avionics domain, also called ACD, and on the other hand, an intermediate non-secured domain, also called AISD.

In the example of FIG. 1, the communication gateway 14 includes an information processing unit 40, for example made up of a memory 42 associated with a processor 44.

The transceiver 16 is a radio transceiver, for example able to communicate with a base station of a cellular telephone network. The transceiver 16 is then for example according to a cellular telephony standard, such as the LTE (Long Term Evolution) standard or the UMTS (Universal Mobile Telecommunications System) standard. Alternatively or additionally, the transceiver 16 is according to standard IEEE 802.11, also called the Wi-Fi™ standard, or standard IEEE 802.15, also called the Bluetooth® standard.

In the example of FIG. 1, the transceiver 16 is a separate electronic device from the communication gateway 14. The transceiver 16 is then connected to the communication gateway 14, for example via an Ethernet connection. In an alternative that is not shown, the transceiver 16 is integrated into the communication gateway 14, and the communication gateway 14 is then configured to communicate directly, via its internal transceiver, with the external electronic system 18.

The external electronic system 18 is for example a base station of a cellular telephony network, i.e., a base station of a radio communication network according to a cellular telephony standard, such as the LTE standard or the UMTS standard.

The flight management system 20 is configured to send the satellite positioning system 22 the current date received from the electronic communication gateway 14, for the initialization of said satellite positioning system 22.

The flight management system 20 is also configured to receive a current position of the aircraft, from said satellite positioning system 22 and after its initialization, during which the satellite positioning system 22 has received the current date from the communication gateway 14, optionally via the flight management system 20.

As an optional addition, the flight management system 20 is configured to send, to the set of avionics system(s) 12 and/or to the electronic communication gateway 14, the current position of the aircraft, received from the satellite positioning system 22.

The satellite positioning system 22 is for example a satellite positioning system receiver, also called GNSS receiver. In the example of FIG. 1, the satellite positioning system 22 is connected both to the flight management system 20 and to the electronic communication gateway 14.

In the example of FIG. 1, the acquisition module 30, the transmission module 32, as well as, optionally and additionally, the computation module 34 and the receiving module 36, are each made in the form of software executable by the processor 44. The memory 42 of the communication gateway 14 is then able to store acquisition software configured to acquire information from the external system 18 and transmission software configured to send acquired information to an avionics system 20, 22 on board the aircraft, as well as, optionally and additionally, computation software configured to compute a UTC date from a local date, when the acquired current date is the local date, and receiving software configured to receive, from the satellite positioning system 22 and after its initialization, a current position of the aircraft.

In an alternative that is not shown, the acquisition module 30, the transmission module 32, as well as, optionally and additionally, the computation module 34 and the receiving module 36, are each made in the form of a programmable logic component, such as an FPGA (Field Programmable Gate Array), or in the form of a dedicated integrated circuit, such as an ASIC (Applications Specific Integrated Circuit).

In the example of FIG. 1, the transmission module 32 is configured to send the acquired current date to the flight management system 20, for the initialization of said flight management system 20. The transmission module 32 is also configured to send the acquired current date to the satellite positioning system 22 (arrow F1), for the initialization of said satellite positioning system 22.

Optionally and additionally, the acquisition module 30 is further configured to acquire, from the external system 18, a current position of the aircraft upon powering on the gateway 14. According to this optional addition, the transmission module 32 is further configured to send the acquired current position to said avionics system 20, 22, for the initialization of the latter.

Figure 2:
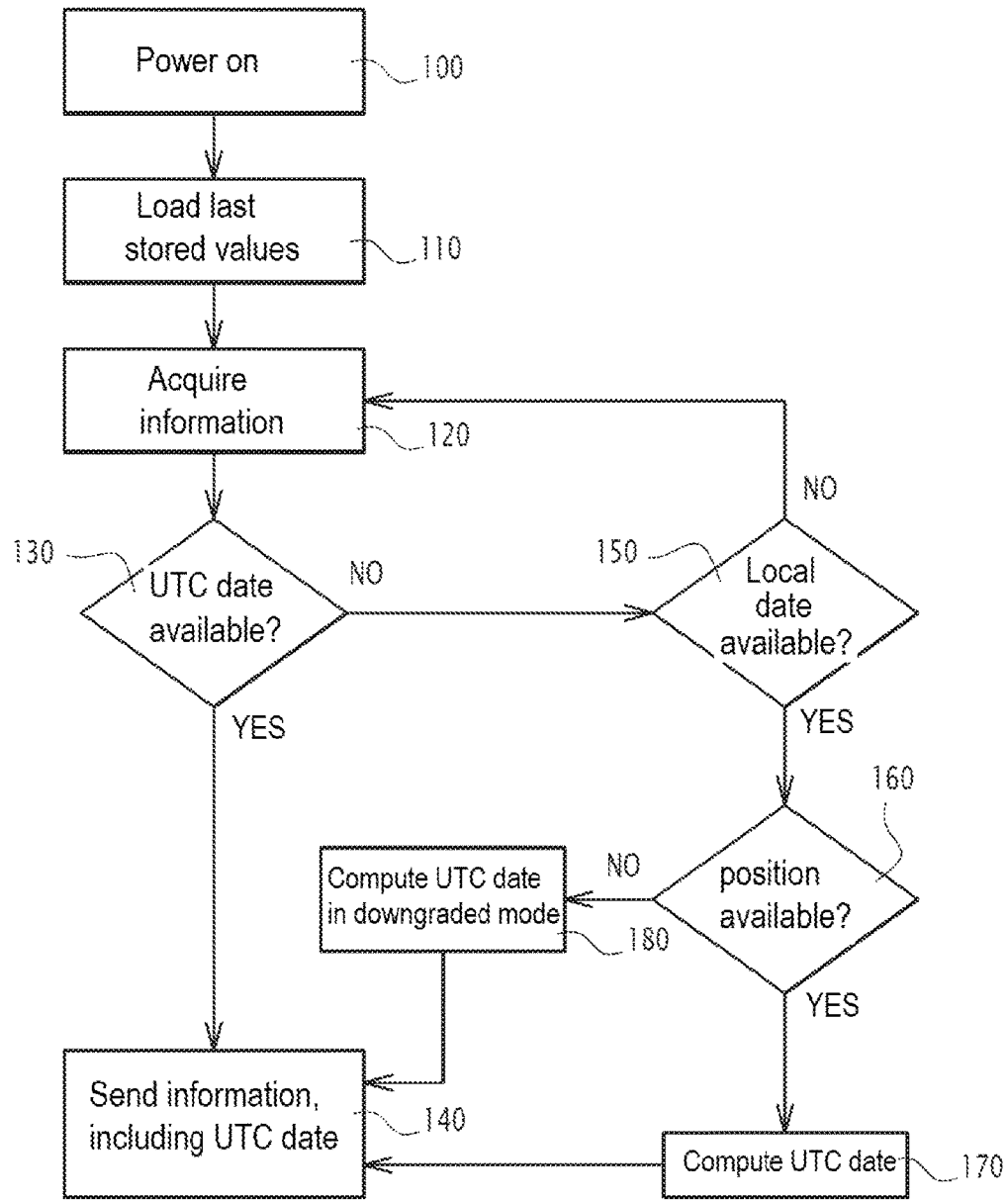
FIG. 2 is a flowchart of a method for processing information according to the invention.

The operation of the avionics communication installation 10, and in particular of the communication gateway 14, will now be described in more detail in light of FIG. 2, showing a flowchart of the method for processing information according to the invention.

On each power-up, the communication gateway 14 records, in its memory 42, the local date and the UTC date, or even the position of the aircraft, when this information is available, this information for example being provided by the electronic clock system 24, respectively by the satellite positioning system 22.

During an initial step 100, the communication gateway 14 is powered on electrically again.

The communication gateway 14 then begins, during step 110, by charging, i.e., recovering, the most recent values that have been recorded if applicable in the memory 14 upon the powering on having preceded the powering on of step 100. The values recovered during step 110 are for example the local date and the UTC date upon the last powering on, or even the position of the aircraft during this last powering on.

During the following step 120, the communication gateway 14 acquires, via its acquisition module 30, the current date, or even the current position of the aircraft, from the external electronic system 18.

The communication gateway 14 next verifies, during the following step 130, whether the UTC date was acquired during step 120 and is available to be sent to the set of avionics system(s) 12, for example to the flight management system 20 and the satellite positioning system 22.

In case of positive verification during step 130, the communication gateway 14 then sends, during step 140 and via its transmission module 32, the information acquired during step 120, in particular the current UTC date, or even the current position of the aircraft, to the set of avionics system(s) 12, in order to facilitate the initialization of the avionics systems 20, 22 receiving this information.

In the example of FIG. 1, the information acquired by the acquisition module 20 is sent directly to the flight management system 20 by the transmission module 32, and the flight management system 20 resends this information to the satellite positioning system 22, as well as the electronic clock system 24.

Alternatively, this acquired information is also sent directly to the satellite positioning system 22 via the transmission module 32, as shown with arrow F1 in FIG. 1.

In case of negative verification during step 130, i.e., if a UTC date has not been acquired during step 120, the communication gateway 14 goes to step 150 to verify whether a local date was acquired during step 120 and is available for subsequent computation(s), for example to compute a UTC date from said local date.

In case of negative verification during step 150, i.e., if a local date has not also been acquired during the preceding step 120, the method returns to step 120 in order to again acquire information from the external system 18, to try in particular to acquire at least one current date from among a UTC date and a local date.

In case of positive verification during step 150, i.e., if a UTC date has been acquired during the preceding step 120, the method goes to step 160 in order to determine whether a position of the aircraft was acquired during step 120 and is available for subsequent computation(s) from the local date and the position of the aircraft.

If a position of the aircraft was acquired during step 120 and the verification of step 160 is therefore positive, the communication gateway 14 computes, during the following step 170 and via its computation module 34, the UTC date from the local date, when the acquired current date is said local date.

In the example of step 170, the computation module 34 computes the UTC date from the acquired local date and position of the aircraft and from a table of world time zones, said table of time zones making it possible to determine the time zones corresponding to the acquired position and, then knowing the time zone associated with the acquired local date, to compute the UTC date corresponding to the acquired local date.

At the end of step 170, the communication gateway 14 goes to step 140, during which its transmission module 32 sends the information acquired during step 120, in particular the position of the aircraft, as well as the UTC date computed during step 170, to the set of avionics system(s) 12, to facilitate the initialization of the avionics systems 20, 22 receiving this information.

If no position of the aircraft was acquired during step 120 and the verification of step 160 is therefore negative, the communication gateway 14 goes to step 180 in order to compute a UTC date in downgraded mode.

During step 180, the computation module 34 computes a time difference between the local date acquired during the preceding step 120 and the local date recorded during the powering on preceding the powering on of step 100, this recorded local date having been recovered during step 110. In order to obtain the current UTC date, the computation module 34 then adds this computed time difference to the UTC date recorded during the last powering on and also recovered during step 110, the current UTC date then being considered to be equal to the sum of the last recorded UTC date and the computed time difference.

At the end of step 180, the communication gateway 14 goes to step 140, during which its transmission module 32 sends the UTC date computed during this step 180 to the set of avionics system(s) 12.

After step 140, in particular when the satellite positioning system 22 has finished its initialization and is in navigation mode, the receiving module 36 receives a newly updated current position of the aircraft from the satellite positioning system 22, either via the flight management system 20, or directly from said satellite positioning system 22, as shown with arrow F2 in FIG. 1. This reception of the newly updated current position of the aircraft is preferably done regularly, and then makes it possible to back up the position of the aircraft next time the communication gateway 14 is powered on.

When the position of the aircraft 10 is acquired in addition to the current date during step 120 from the external electronic system 18, this position is sent to the satellite positioning system 22 so that it may be initialized more quickly. The satellite positioning system 22 can then perform its initialization once it sees one or several satellites when the aircraft is outside a building, for example when the aircraft leaves a hangar.

Alternatively, when only the current date has been acquired during step 120 from the external electronic system 18, the crew of the aircraft nevertheless has the option of manually entering the position of the aircraft, so that this manually entered position, as well as the current date acquired by the communication gateway 14, are sent to the satellite positioning system 22. The satellite positioning system 22 can thus perform its initialization, including inside a building, when the position of the aircraft 10 has not been acquired during step 120.

One skilled in the art will also note that the current date is sent by the communication gateway 14 to all of the avionics system(s) 12 preferably only during the initialization phase following a powering on (step 100), the electronic clock system 24 next, in the nominal operating mode after this initialization phase, taking over for the communication gateway 14 to regularly send a newly updated current date to the other systems 20, 22 of the set of avionics system(s) 12.

One can thus see that the electronic communication gateway 14, and the associated method, make it possible to offer an additional functionality, namely to acquire the current date, or even the current position of the aircraft, from the external electronic system 18, then to send this current date, or this current position, to the avionics system(s) on board the aircraft, such as the flight management system 20 and/or the satellite positioning system 22, to then facilitate the initialization of said avionics system(s) 20, 22 on board the aircraft.

The electronic communication gateway 14, and the associated method, according to the invention make it possible to avoid the need to power the electronic clock system 24 continuously, and then no longer require having an autonomous battery to power the electronic clock system 24 in case of power outage from the electrical grid of the aircraft. The absence of this battery then makes it possible to simplify maintenance, decrease the mass of the equipment on board the aircraft, and avoid a fire risk.

The invention claimed is:

1. An electronic communication gateway intended to be placed on board an aircraft and configured to communicate with an external electronic system, positioned outside the aircraft, said information being exchanged in the form of radio waves between the external system and the aircraft, the electronic communication gateway comprising:

an acquisition module configured to acquire information from the external system, and a transmission module configured to transmit the acquired information to an avionics system on board the aircraft, wherein the acquisition module is configured to acquire, from the external system, a current date upon powering on the gateway, and the transmission module is configured to send the acquired current date to the avionics system, for the initialization of said avionics system.

2. The electronic communication gateway according to claim 1, wherein the acquisition module is further configured to acquire, from the external system, a current position of the aircraft upon powering on the gateway, and wherein the transmission module is further configured to send the acquired current position to said avionics system, for the initialization of the latter.

3. The electronic communication gateway according to claim 1, wherein the communication gateway further comprises a computation module configured to compute a UTC date from a local date, when the acquired current date is a local date.

4. An avionics communication installation intended to be placed on board an aircraft, the avionics communication installation comprising a set of avionics system(s) and an electronic communication gateway connected to the set of avionics system(s), wherein the electronic communication gateway is according to claim 1.

5. The avionics communication installation according to claim 4, wherein the set of avionics system(s) includes a flight management system, the electronic communication gateway being connected to the flight management system, and the transmission module being configured to send the acquired current date to the flight management system, for the initialization of said flight management system.

6. The avionics communication system according to claim 5, wherein the set of avionics system(s) further includes a satellite positioning system, wherein the flight management system is configured to send the satellite positioning system the current date received from the electronic communication gateway, for the initialization of said satellite positioning system, and wherein the flight management system is configured to receive, from said satellite positioning system and after initialization, a current position of the aircraft.

7. The avionics communication installation according to claim 6, wherein the flight management system is configured to send, to the set of avionics system(s) and/or to the electronic communication gateway, the current position of the aircraft, received from the satellite positioning system.

8. The avionics communication installation according to claim 4, wherein the set of avionics system(s) includes a satellite positioning system, the electronic communication gateway being connected to the satellite positioning system, and wherein the transmission module is configured to send the acquired current date to the satellite positioning system, for the initialization of said satellite positioning system.

9. The avionics communication system according to claim 8, wherein the communication gateway further comprises a receiving module configured to receive, from said satellite positioning system and after initialization, a current position of the aircraft.

10. A method for processing information, said method being implemented by an electronic communication gateway intended to be placed on board an aircraft and configured to communicate with an external electronic system, positioned outside the aircraft, said information being exchanged in the form of radio waves between the external system and the aircraft, the method comprising:

the acquisition of information from the external system; and the transmission of the acquired information to an avionics system on board the aircraft, wherein, during the acquisition, a current date is acquired, from the external system, upon powering on the gateway, and during the transmission, the acquired current date is sent to the avionics system, for the initialization of said avionics system.

11. A non-transitory computer-readable medium including a computer program comprising software instructions which, when executed by a computer, carry out a method according to claim 10.

* * * * *